United States Patent [19]
Mansfield

[11] Patent Number: 5,295,421
[45] Date of Patent: Mar. 22, 1994

[54] BLADE FOR FIBER RIBBON STRIPPING

[75] Inventor: Charles M. Mansfield, Austin, Tex.

[73] Assignee: Minnesota Mining and Manufacturing Company, St. Paul, Minn.

[21] Appl. No.: 899,812

[22] Filed: Jun. 23, 1992

[51] Int. Cl.⁵ .............................................. H02G 1/12
[52] U.S. Cl. ...................................... 81/9.4; 81/9.44; 30/90.1
[58] Field of Search .................... 81/9.4–9.51; 30/90.1

[56] References Cited

U.S. PATENT DOCUMENTS

| | | |
|---|---|---|
| 1,675,838 | 7/1928 | Bernard .............................. 81/9.44 |
| 3,827,317 | 8/1974 | Perrino . |
| 4,271,729 | 6/1981 | Perrino et al. . |
| 4,315,444 | 2/1982 | Perrino et al. . |
| 4,850,108 | 6/1989 | Perrino et al. . |

*Primary Examiner*—James G. Smith
*Attorney, Agent, or Firm*—Gary L. Griswold; Walter N. Kirn; Jack V. Musgrove

[57] ABSTRACT

A novel blade design for a tool which strips the buffer layer and protective coating away from a ribbon having a plurality of optical fibers. The blade design includes two generally identical blade halves, each having a cutting edge. Each cutting edge has side borders, and semicircular cutouts between the borders, forming tips between adjacent cutouts. The tips are smoothly rounded, and also recessed whereby, when the blades are brought together in a closed, cutting position, the tips are still separated by a gap. The cutouts have an effective diameter which is slightly larger than the outer diameter of the fiber cladding. The rounded tips minimize damage to the fibers during the stripping operation by providing a self-centering effect as the tips graze the buffer coating of the fibers in a misaligned ribbon, and by further reducing the effective force applied by the tips to the fibers. The larger cutouts and gap between opposing tips further minimize any possible damage to the fibers.

6 Claims, 2 Drawing Sheets

BLADE FOR FIBER RIBBON STRIPPING

BACKGROUND OF THE INVENTION

1. Field of the Invention

The present invention generally relates to mechanical tools used to strip wires, cables, etc., and more particularly to an improved blade design for a tool used to strip the protective layers away from a group of optical fibers joined in a ribbon.

2. Description of the Prior Art

Stripping tools are well-known in the art, such as the wire strippers commonly used to remove the insulative plastic layer away from copper wires. Exemplary strippers are shown in U.S. Pat. Nos. 3,827,317 and 4,271,729. Stripping of the outer insulative layer is often required to allow electrical connection of the wire to other conductors, or to attach the terminal end of the wire to an electrical connector. Similarly, it is often necessary to strip the outer coating from an optical fiber (such as is used in telecommunications) prior to a connection or splice operation on the fiber.

In this regard, it is helpful to understand the construction of a typical optical fiber. The light signal travels within the innermost core of the fiber, usually made of glass (silica), although a polymer is sometimes used. The core is surrounded by a cladding, typically formed from the same material as the core (silica), although it is doped differently to provide a lower refractive index (resulting in internal reflection of most of the light within the core). The cladding is further surrounded by a buffer coating to protect the fiber from adverse external effects. The buffer coating is typically formed from a UV-cured polymeric material.

To prepare a fiber for a connector or splice, it is necessary to strip away the buffer coating, but without damaging the cladding layer. This operation can be very difficult due to the small dimensions involved and the ease with which the glass cladding can be nicked. For example, most optical fibers used in data communications have an outer (cladding) diameter of 125 $\mu$m and a buffer diameter of 250 $\mu$m. The core diameter varies depending upon application, e.g., a single-mode fiber may have a 10 $\mu$m core diameter and a multimode fiber may have up to an 85 $\mu$m core diameter.

The tools illustrated in the above-mentioned patents have been modified for use in stripping optical fibers, but still possess certain disadvantages due to the fact that the stripping operation is critical in at least two respects. First of all, if the stripping tool digs too far into the buffered fiber (or the fiber is improperly aligned with the blades of the tool), it will damage the cladding, possibly breaking the fiber, or at least decreasing the tensile strength of the fiber. Secondly, if the blades do not cut deep enough, then the buffer coating may not be fully stripped, which can lead to later problems such as misalignment in a splice or inability to insert the fiber into a connector ferrule.

Techniques have been devised to minimize the foregoing deficiencies, such as improved manufacture of the stripper blades, as discussed in U.S. Pat. No. 4,315,444. These problems still remain, however, and are especially pronounced when simultaneously stripping a plurality of fibers which have been formed into a flat ribbon. Such a fiber ribbon typically includes (in addition to the core, cladding and buffer layers of each fiber) an outer protective coating, such as a polyester film or tape, which is bonded to the fibers, typically with an acrylic adhesive. Other ribbons provide a UV curable polymeric matrix which bonds or encapsulates the fibers. Therefore, in addition to removing buffer coating, the stripping tool must also remove the outer bonding material.

The tools described in the above-mentioned patents have further been modified for use in stripping fiber ribbons, as demonstrated in U.S. Pat. No. 4,850,108. This prior art stripper and its components are shown in FIGS. 1-4, and are discussed more fully below in the detailed description of the preferred embodiment. The closest prior art blade design is illustrated in FIG. 4, along with a cross-sectional view of the fiber ribbon. FIG. 4 serves to illustrate the additional problem that, even with the relatively tight tolerances provided for ribbon alignment, the ribbon may still be misaligned prior to stripping, with the likely result that one or more of the individual fibers will become damaged. An alternative prior art "flat" blade design, having no semicircular cutouts, does not require any alignment at all, but is not suited to stripping ribbons wherein the fibers are interposed between two polyester films. Such a ribbon construction in found in the ASR ribbon sold by American Telephone & Telegraph Co. Flat blade designs do not strip this type of ribbon well, as the straight blade edge cannot easily puncture the outer tape. It would, therefore, be desirable and advantageous to devise a blade design for a fiber ribbon stripping tool which can easily strip such ribbons, and further which would minimize or eliminate misalignments, as well as safeguard against overstripping, i.e., cutting into the fiber cladding or core.

SUMMARY OF THE INVENTION

The present invention is directed to a stripping tool having a pair of blades with improved cutting features, including: (i) semicircular cutting edges having an effective diameter slightly larger than that of the cladding diameter of the fibers to be stripped; (ii) rounded tips between the semicircles; and (iii) a preset gap between opposing tips when the blades are brought as closely as possible together. The rounded tips help to self-center the ribbon with respect to the blades, by "pushing" on the buffer coating, and the enlarged, semicircular cutouts enhance this effect. The gap between opposing tips permits a greater tolerance of any misalignment of the ribbon while still preventing fiber damage, and also simplifies manufacture of the blades since they can be formed using a die having a single punch.

BRIEF DESCRIPTION OF THE DRAWINGS

The novel features and scope of the invention are set forth in the appended claims. The invention itself, however, will best be understood by reference to the accompanying drawings, wherein:

DESCRIPTION OF THE PREFERRED EMBODIMENT

Figure 1:
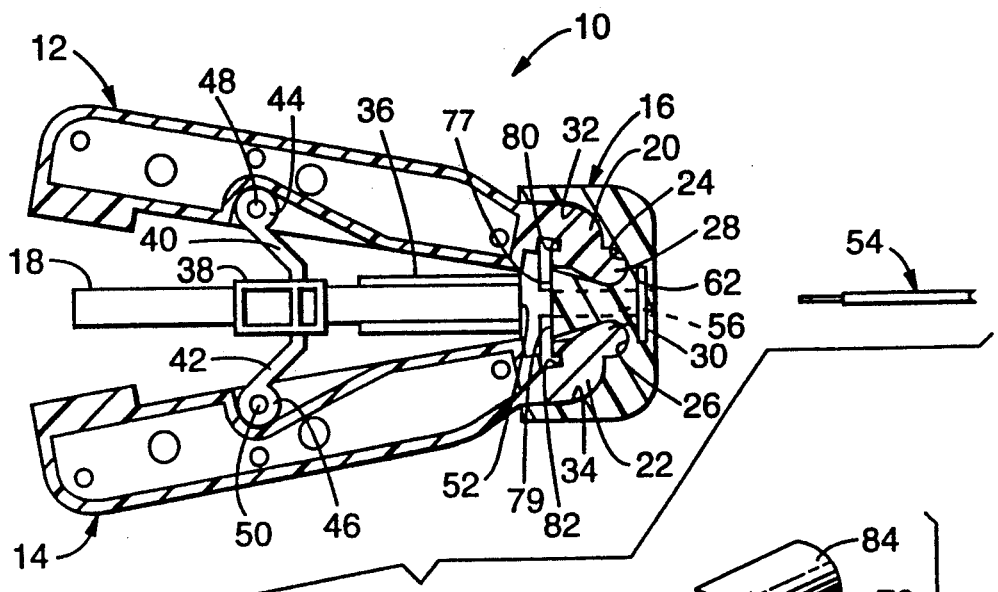
FIG. 1 is a side elevational view of a prior art fiber ribbon stripping tool (with the handles in section) which may be used with the blade design of the present invention.

As indicated above, the present invention relates to a novel blade design for use with an existing fiber ribbon stripping tool. The prior art tool is fully disclosed in U.S. Pat. No. 4,850,108, but the essential details of that tool are repeated here for the sake of clarity. With reference now to the figures, and in particular with reference to FIG. 1, there is depicted the prior art stripping tool 10 which is generally comprised of grip members or handles 12 and 14, end block 16, and stop member 18. Each of these components may be constructed of any durable material, preferably a moldable polymeric material.

The proximate ends 20 and 22, respectively, of handles 12 and 14 are attached to end block 16 by means of circular recesses 24 and 26 formed in end block 16 which receive circular projections 28 and 30, respectively, of ends 20 and 22, forming two-dimensional ball-and-socket joints. Projections 28 and 30 may also have holes therein (not shown) to receive pivot posts (not shown) formed in recesses 24 and 26, which further facilitate attachment of handles 12 and 14 to end block 16. Larger recesses 32 and 34, adjacent recesses 24 and 26, respectively, provide sufficient room for projections 28 and 30 to allow pivotal movement of handles 12 and 14.

Stop member 18 is slidably attached to end block 16 by a (three-walled) guide channel 36 which may be integrally molded with end block 16. Stop member 18 is also coupled to handles 12 and 14 by a linkage member 32 which has attached thereto (and preferably integrally molded therewith) two arms 40 and 42 each terminating in enlarged ends 44 and 46. These ends have holes therein for receiving pivot posts 48 and 50 formed on handles 12 and 14, respectively. This linkage serves two purposes. First of all, linkage member 38 and arms 40 and 42 are formed of a flexible polymeric material, such as acetal, whereby the arms may hinge at their connection to linkage member 38, but they are molded in an extended position as shown in FIG. 1 so as to bias arms 12 and 24 in the open position. Secondly, linkage member 38 may be adjustably fixed to stop member 18, such as by providing interengaging notches (not visible in FIG. 1) on the inside surface of linkage 38 and on the adjacent surface of stop member 18 whereby, as handles 12 and 14 are squeezed together, stop member 18 moves forwardly toward end block 16. If the forward end 52 of stop member 18 is a flat wall, then this wall will serve to provide a barrier limiting the insertion distance of a fiber ribbon 54 through a bore 56 of end block 16. In this manner, the length of material to be stripped from ribbon 54 may be preestablished. Alternatively, stop member 18 may include a heating element (not shown), and forward end 52 may have a slot therein for receiving ribbon 54, whereby the ribbon may be preheated prior to stripping, as taught in U.S. Pat. No. 4,850,108.

Figure 2:
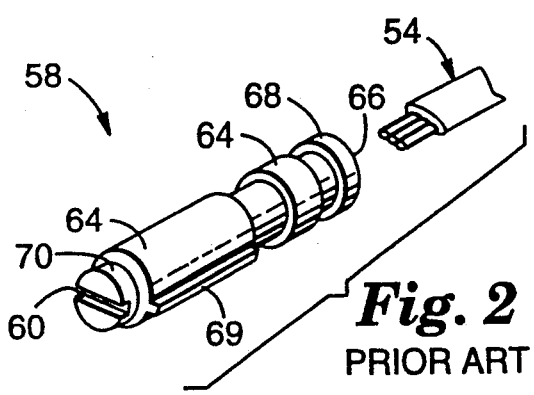
FIG. 2 is a perspective view of a prior art tube guide used with the prior art tool of FIG. 1, and which may also be used in the present invention.

Referring now to FIG. 2, the prior art stripping tool 10 also uses a tubular guide member 58 to align fiber ribbon 54 with the cutting blades (which are discussed below in conjunction with FIGS. 3–5). Guide member 54, which has a thin slot 60 therethrough for receiving ribbon 54, is sized to tightly fit within bore 56 of end block 16, and may be constructed of any durable material, including metals such as aluminum or polymers such as polycarbonate. Means may be provided to removably secure guide member 58 within end block 16; in the preferred embodiment, such means comprises a retaining clip (not shown) which may be inserted through an opening 62 in end block 16, the clip engaging annular flanges 64 formed by an area of reduced diameter at the proximate end 66 of guide member 58. Since different guide members 58 may be used depending upon the type of ribbon being stripped, guide member 58 may optionally have an identification ring thereon (not shown), such as at proximate end 66 by attachment to another flange 68, the ring having printed matter to indicate the specifications of that particular guide member. Guide member 58 should also be keyed or polarized, as by providing a spline 69 which mates with a complementary groove (not shown) formed in bore 56, to ensure that the ribbon (i.e., slot 60) is properly oriented.

Figure 3:
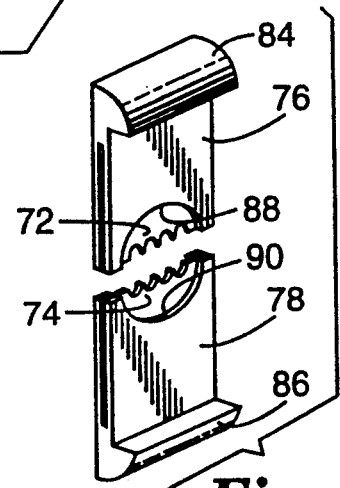
FIG. 3 is a perspective view depicting prior art blades and blade holders, the holders being usable with the blades of the present invention.

When guide member 58 is fully inserted into bore 56, the distal end 70 of guide member 58 is disposed flush against two blades 72 and 74, which are supported by blade holders 76 and 78 as depicted in FIG. 3. The blade holders 76 and 72 are inserted into slots 77 and 79, respectively, located in end block 16, the slots being generally perpendicular to bore 56. Slots 77 and 79 are also aligned with recesses so and 82 in handles 12 and 14, respectively, the recesses forming hooks which engage the flanged ends 84 and 86 of holders 76 and 78, respectively. In this manner, as the handles are squeezed, blades 72 and 74 are brought together. Recesses 80 and 82 have sufficient tolerance to allow some relative movement between each handle and its corresponding blade holder, and yet still engage the flange of the blade holder. Blade holders 76 and 78, as well as guide member 58 (or the retaining clip therefor), may be color-coded according to the particular fiber ribbon which they are designed to strip.

As shown in FIG. 3, blade holders 76 and 78 have semicircular cutouts 88 and 90, respectively, at the exposed edges of the blades whereby, when blades 72 and 74 are brought together, the cutouts form a circle having an inner diameter which is approximately equal to the outer diameter of distal end 70 of guide member 58. This circle provides a means for gauging the distance between the cutting edges of the blades. Thus, by providing a precise diameter for distal end 70, the relative position of blades 72 and 74 in the closed state may be carefully controlled to minimize damage to the blades (as well as any inserted fiber ribbon).

With reference to FIGS. 4A, 4B, 5A and 5B, the novel blade design which is the subject of this invention is now explained and contrasted with the prior art blade design. In the prior art design of FIGS. 4A and 4B, each of the blades 72 and 74 have a plurality of semicircular cutouts 92 whose size and position, as a practical matter, correspond as closely as possible to the size and location of the individual fibers 94 in ribbon 54. It can be seen that the tips or lands 96 between adjacent cutouts 92 have straight (or flat) edges which are collinear with the borders 98 of the cutting edge of the blades, and further that these tips 96 are defined on either side by sharp corners of approximately 90°.

Figure 4A:
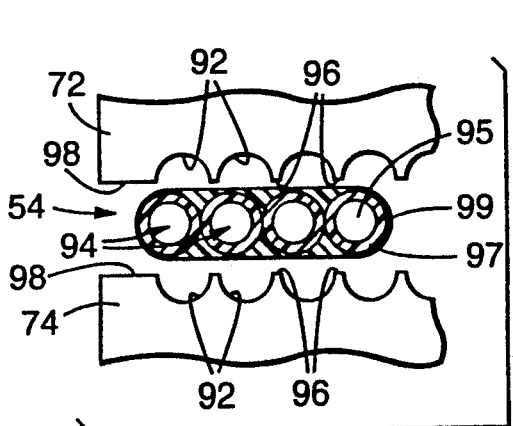
FIGS. 4A and 4B are front elevational views of the prior art blade design shown with a fiber ribbon in cross-section.
Figure 4B:
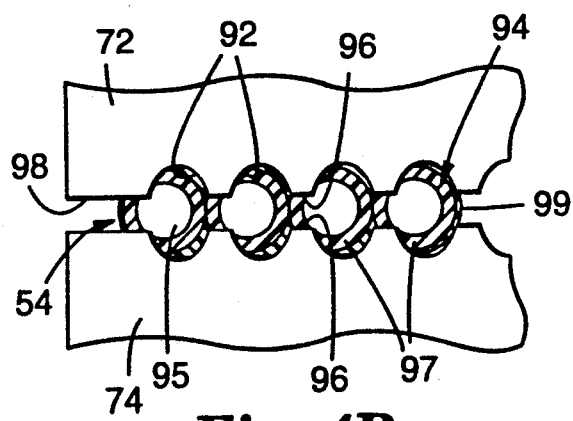

In FIG. 4A, fiber ribbon 54 is shown slightly misaligned with respect to blades 72 and 74, with an approximate lateral shift of about 0.0025" (63.5 μm). This amount of misalignment is typical in the various tolerances of tool 10, including those of blades 72 and 74, and guide member 58 (i.e., the outer diameter of the bushing portion of guide member 58, and the location of slot 60 therein). Actual misalignment may be greater, but even this small shift will result in damage to the fibers during stripping. Specifically, as blades 72 and 74 move to the closed position, the sharp corners of tips 96 will penetrate the outer bonding material 99, and will further cut, or at least nick, the glass cladding 95 of the fibers 94. While the force from tips 96 may cause ribbon 54 to shift slightly back into proper position, experimentation has shown that this occurs only after irreparable damage has been done to the glass portion (cladding) 95 of the fibers (as illustrated in FIG. 4B), severely compromising their tensile strength. This effect is exacerbated by the fact that cutouts 92 are tightly sized to the outer diameter of cladding 95, as well as the fact that opposing tips 96 from blades 72 and 74 actually come into contact when the blades are in the fully closed position. Of course, if the blades are grossly misaligned whereby the flat portions of tips 96 contact the upper surface of the fibers, then there will be no shifting of the ribbon and, in addition to damaging the fibers, the tips 96 will most likely also be damaged.

Figure 5A:
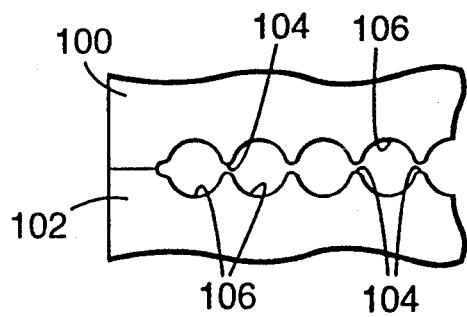
FIGS. 5A and 5B are front elevational views depicting the blades of the present invention in their closed state.
Figure 5B:
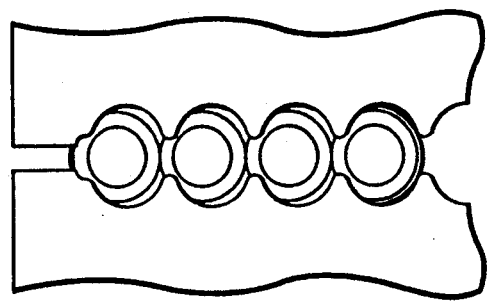

The novel blade design of FIGS. 5A and 5B, however, has resulted in greatly improved stripping performance. As with the prior art construction, novel blades 100 and 102 are gripped by blade holders such as 76 and 78, but there are three significant differences between the prior art design and the present invention. First of all, the tips 104 between adjacent cutouts 106 are smoothly rounded, i.e., they do not present any jagged edges or sharp corners which would more easily dig into the buffered coating material 97 of the fibers, preventing alignment. Tips 104 should have a radius of curvature in the range of 12-38 μm, preferably about 25 μm, blending tangentially with cutouts 106 at an angle of about 45°. Those skilled in the art will appreciate that a very small radius will result in a smaller grazing angle (should tips 104 contact any portion of the fibers), which would enhance the self-centering effect of blades 72 and 74. Secondly, the effective diameter of cutouts 106 is larger than the outside diameter of cladding 95 of the fibers, by an amount in the range of 60-80 μm, and preferably about 73 μm. In other words, if the ribbon to be stripped includes fibers having a cladding diameter of 125 μm, then the effective diameter of cutouts 106 is preferably about 198 μm. Thirdly, when blades 100 and 102 are brought together in the fully closed state, opposing tips 104 are still separated by a small gap. For stripping performance, this gap is preferably in the range of 25-50 μm; as explained below, however, the provision of a gap may also be used to simplify the manufacture of the blades and, in this regard, the gap is preferably in the range of 50-76 μm. Therefore, in the preferred embodiment, the gap is about 50 μm.

By providing rounded tips 104, the blades allow a misaligned ribbon 54 to properly position (center) itself as blades 100 and 102 are brought together. The final position of the shifted fibers is depicted in FIG. 5B. As the rounded blades are closed, the sides of tips 104 will push against (instead of dig into) the buffer coatings 97, effectively pushing the fibers into proper position. Experimentation has shown that this action eliminates or reduces blade contact with the cladding layers and, if the tips do contact the glass portion of the fiber (due to a very large misalignment) any resulting nick on cladding 95 will be much less severe than would be caused by the prior art blade design. Moreover, any potential damage is further reduced by the larger dimensions of cutouts 106 and the gap between opposing tips 104.

Operation of stripping tool 10 is essentially unchanged by use of the novel blades 100 and 102. First, if the fiber ribbon is part of a bundled group of ribbons in a cable, then a portion of the cable jacket must be cut back to reveal the ribbons. Most cables have several protective layers, e.g., the ribbons are first surrounded by a thermal wrap, then an inner sheath, then a polyester tape layer, followed by an outer sheath, with one or more intervening layers of strength members (i.e., aramid fibers). Each of these layers must be removed to provide access to the fiber ribbons.

Once a single ribbon is so exposed, the tool should be furnished with the appropriate guide member 52 and blades 100/102, depending upon the type of ribbon (i.e., number of fibers and size) being stripped. Ribbon 54 is then inserted into guide member 58, and handles 12 and 14 are squeezed together. If tool 10 includes the prior art heating system alluded to above, then the user will wait a few seconds while the ribbon is heated. As ribbon 54 is pulled away from tool 10 with the handles depressed, the bonding material 99 of ribbon 54, and buffer coatings 97 of each of the individual fibers 94, are stripped away from the ribbon. The stripped fibers are then ready for insertion into a connection device, such as the FIBRLOK Multi-Fiber Optical Splice sold by Minnesota Mining and Manufacturing Co. (3M—assignee of the present invention; FIBRLOK is a trademark of 3M).

Blades 100 and 102 are preferably formed of hardenable steel, and may generally be manufactured in accordance with the disclosure of U.S. Pat. No. 4,315,444. Instead of using several punches, however, to form cutouts 106, a single die punch may be used to form all of the cutouts in a given blade pair. Provision of the gap between opposing tips 104, and the rounded nature of tips 104 make a single piercing operation possible, and greatly simplifies the die cutting tool. In this regard, the creation of larger cutouts 106 presents a potential manufacturing problem in that the tips 104 thereby formed would be much narrower than in the prior art blades; these narrowed tips would be much weaker and subject to deformation or breakage during use of tool 10. The provision of the gap between opposing tips 104, however, greatly reduces the likelihood of such damage to tips 104.

The dimensions of tool 10 and blades 100 and 102 may vary considerably depending upon the particular application. Of course, handles 12 and 14 should be sized to allow manual operation, e.g., about 10 cm long. Blades 100 and 102 are preferably about 8 mm wide, and the circle formed by cutouts 88 and 90 on the blade holders preferably has a diameter of about 3 mm (i.e., the outer diameter of distal end 60 of guide member 58 is about 3 mm). The geometry of cutouts 106 in the blades depends upon the particular ribbon being stripped, i.e., the number of fibers in the ribbon as well as the spacing and size of the fibers. In FIGS. 5A and 5B, the blades are depicts as having four cutouts for simplicity. In the preferred embodiment of the invention, the blades have eighteen cutouts; such blades may still be used with lower fiber-count ribbons by simply substituting another guide member 58 having a different size slot 60.

Although the invention has been described with reference to specific embodiments, this description is not meant to be construed in a limiting sense. Various modifications of the disclosed embodiment, as well as alternative embodiments of the invention, will become apparent to persons skilled in the art upon reference to the description of the invention. It is therefore contemplated that such modifications can be made without departing from the spirit or scope of the present invention as defined in the appended claims.

I claim:

1. An article for use in a fiber optic ribbon stripping tool, the article comprising:

a first blade member having a cutting edge, said cutting edge having first and second borders, and having a plurality of semicircular cutouts located between said borders, said cutouts defining tips between adjacent ones of said cutouts;

a second blade member having a cutting edge, said cutting edge having first and second borders, and having a plurality of semicircular cutouts located between said borders, said cutouts defining tips between adjacent ones of said cutouts, said tips of said second blade member being aligned with said tips of said first blade member, forming pairs of opposing tips; and said tips of said first blade member being recessed from a line defined by said borders of said cutting edge of said first blade member, and said tips of said second blade member being recessed from a line defined by said borders of said cutting edge of said second blade member whereby, when said borders of said first blade member are in contact with said borders of said second blade member, there is a gap between each of said pairs of opposing tips.

2. The article of claim 1 wherein:

said blade members are designed for a ribbon having a plurality of fibers of known diameter; and each of said cutouts in said first and second blade members has an effective diameter which is at least 60 $\mu$m larger than the diameter of the fibers.

3. The article of claim 1 wherein said tips of said first and second blade members are smoothly rounded.

4. The article of claim 1 wherein said gap between said opposing pairs of tips is in the range of 25-76 $\mu$m.

5. The article of claim 1 wherein said gap between said opposing pairs of tips is approximately 50 $\mu$m.

6. The article of claim 2 wherein said tips of said first and second blade members are smoothly rounded.

* * * * *